Feb. 10, 1970
O. H. KAMINKY ET AL
3,494,198
MECHANICALLY ACTUATED TRANSDUCER EQUIPPED WITH
INTEGRAL GAUGE FOR INDICATING ACTUATING FORCE
Filed Sept. 23, 1968
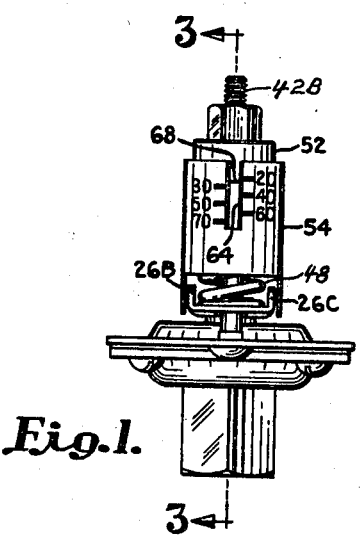
Fig. 1.
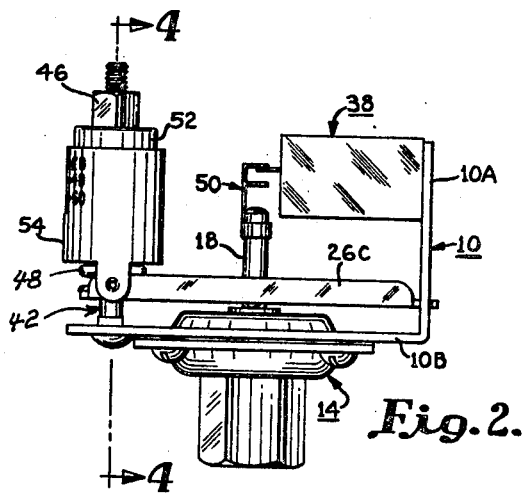
Fig. 2.
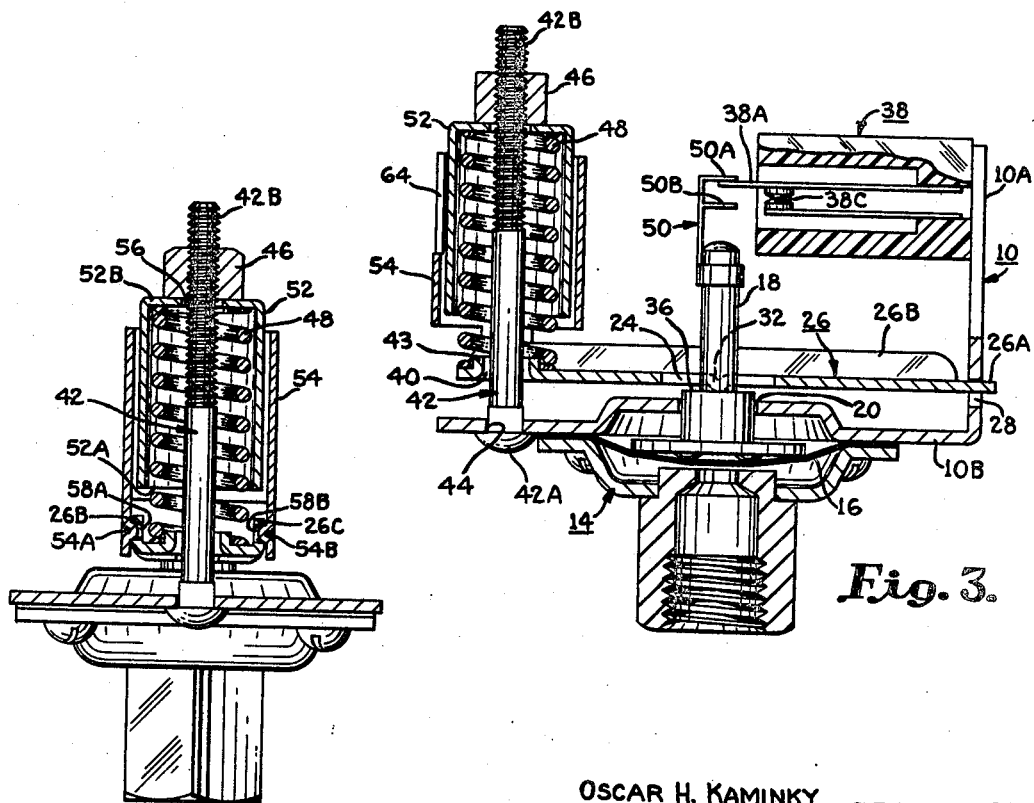
Fig. 3.
Fig. 4.
OSCAR H. KAMINKY
DWIGHT C. LEWIS   INVENTOR.(S)
BY *A. J. De Angelis*
ATTORNEY.

United States Patent Office 3,494,198
Patented Feb. 10, 1970

3,494,198
MECHANICALLY ACTUATED TRANSDUCER EQUIPPED WITH INTEGRAL GAUGE FOR INDICATING ACTUATING FORCE
Oscar Herman Kaminky, Goshen, and Dwight Charles Lewis, Elkhart, Ind., assignors to Penn Controls, Inc., Oak Brook, Ill., a corporation of Delaware
Filed Sept. 23, 1968, Ser. No. 761,590
Int. Cl. G01l 7/08
U.S. Cl. 73—389    5 Claims

ABSTRACT OF THE DISCLOSURE

A pressure actuated switch mechanism having an adjustable range spring is provided with an indicator carried by the movable end of the range spring for movement in unison therewith in response to adjustment of spring compression. Mounted on a main operating lever (through which the range spring opposes the force of the pressure actuator) is a member having a graduated pressure scale indicated thereon and positioned for co-operation with the indicator. The graduated scale member moves with the main operating lever, providing relative motion between the graduated scale and indicator upon compression of the range spring due to movement of either the main operating lever, or the range spring adjustment means, thereby providing a visual gauge which continuously indicates the pressure acting on the switching mechanism notwithstanding readjustment of the range spring setting.

---

The invention relates to mechanically actuated transducers and, more particularly, to visual indicating means, or a gauge, to denote the force operating on such a transducer.

In present day mechanically actuated transducer controls actuated by various operating forces, such as pressure, it is usual to provide separate gauge means for indicating the magnitude of the force operating on the transducer at any given instant. For example, in controls for air compressors or water pumps there is often provided in addition to switching mechanisms responsive to fluid pressure a separate visual pressure gauge indicating the operating pressure of the system. It is often desirable in such systems to determine whether the mechanism is about to begin an operating cycle or is near to terminating one and the pressures at which such operations occur. To do so requires a look at both the gauge and the switch operation.

It is therefore, an object of the invention to provide improved mechanically actuated transducers which incorporate integral gauge means.

It is a further object to provide such gauge means which remain in calibration notwithstanding changes in the range adjustment of the transducers for different applications.

In carrying out the invention, according to one preferred embodiment applied to fluid pressure responsive switching mechanism, a range spring setting indicator is provided on the range adjustment means. The indicator moves with adjustment of the range spring which acts against the force of the pressure actuator through the main operating arm of the switching mechanism. Carried by the main operating arm is a member carrying a graduated scale in pounds of pressure per square inch. This scale cooperates with the range indicator upon relative motion therebetween to indicate visually the pressure acting on the switch. Such indication is continuous upon compression of the range spring by either actuation of the main operating lever arm due to the pressure responsive means or by adjustment of the range spring setting. Thus, adjustment of the compression force of the range spring opposing the pressure responsive means acting on the main operating lever automatically maintains the gauge in calibration for the new set point of the switching mechanism.

It should be noted that, although for convenience the invention will be described as applied to a fluid pressure actuated swtiching mechanism utilizing a diaphragm type pressure actuator, it is, nevertheless, just as applicable to other force responsive mechanisms responding to changes in temperature, humidity or the like and to those using charged pressure elements, direct pressure or bellows type pressure sensors for actuating the main operating lever of the mechanism in opposition to the range spring force. In addition it should be realized that the actuated output mechanism need not be switching means but any other electrical circuit controlling means such as a rheostat, or may be a mechanical, hydraulic or pneumatic control.

Features and advantages of the invention will be seen from the above, from the following description of the preferred embodiment when considered in conjunction with the drawing and from the appended claims.

In the drawing:

FIG. 1 is a simplified diagrammatic, front elevational view of switching mechanism equipped with an integral gauge and embodying the invention;

FIG. 2 is a side elevational view of the mechanism of FIG. 1;

FIG. 3 is a cross-sectional view taken along the line 3—3 of FIG. 1 but slightly enlarged; and FIG. 4 is a cross-sectional view taken along line 4—4 of FIG. 2 and also slightly enlarged.

For convenience, the preferred embodiment of the invention is disclosed with respect to a fluid pressure operated, switching mechanism using a power element of the flexible diaphragm type for actuating a main operating switch lever or arm in response to variations in pressure. However, it should be noted that the term "pressure" as used herein is intended to cover means for actuating the switch arm in one direction in opposition to a range spring and includes actuation by forces acting on the switch arm due to differences of temperature or pressure or operation of a float device or in response to humidity changes. The term "pressure" merely is a convenient name for a source of power energizing the switching device in one direction and it is not intended to limit the claimed invention to the ordinary meaning of the term "pressure" where it is so used.

In the drawing there is illustrated a portion of a switching mechanism housing, generally designated 10, having a vertically extending flange 10A and horizontally extending flange portion 10B. Attached to horizontal flange 10B is a power element, generally designated 14. The power element is of a conventional type and includes, as seen in FIGURE 3, a flexible diaphragm 16 for moving a thrust, or operating pin, 18 upward. Pin 18 extends through an aperture 20 in flange 10B and an aligned aperture 24 in a main operating lever, generally designated 26, of the switching mechanism. Lever 26 is provided with an extending end portion 26A at its right end (FIG. 3), which portion extends into an aperture 28 defined in housing flange 10A to form a fulcrum for operating lever 26. The central portion of lever 26, encircling aperture 24, is depressed to provide abutments 32 which engage an annular shoulder 36 formed on thrust pin 18. Thrust pin 18 extends upward into position to actuate a switch, generally designated 38, which switch is mounted on flange 10A.

The free end of lever 26 is provided with a flanged aperture 40 through which a stud 42 extends loosely. Stud 42 also extends through a registering aperture 44 in horizontal flange 10B and is provided with a round head 42A at the bottom. The upper end 42B of stud 42 is threaded to receive a range adjusting nut 46. The annular flange 43, bounding aperture 40, serves to retain the lower end of a coil type, range spring 48 which is coaxially positioned over pin 42. Adjustable nut 46 threaded on the upper portion 42B of stud 42 provides a means for adjusting the compression of range spring 48 and, thus, the spring force acting to push lever 26 downward against the pressure exerted to push it upward by the annular shoulder 36 of thrust pin 18.

Mounted on the upper end of thrust pin 18 is a switch contacting member 50 having two spaced apart abutments 50A and 50B for engaging a cantilevered switch actuating arm 38A of switch 38. For the embodiment shown the spacing between abutments 50A and 50B is fixed, although, it is to be understood, that such spacing may be adjustable so as to engage switch arm 38A with a predetermined differential between contact opening, and contact closing positions.

Switch 38 is shown, for convenience, as being provided with normally closed contacts 38C with abutment 50A of thrust pin 18 holding switch arm 38A downward in response to low pressure acting on diaphragm 16 of pressure sensor 14. For an air compressor this assumed condition of contacts 38C would cause operation of the compressor motor (not shown). Upon the pressure increasing sufficiently to move diaphragm 16 upward against the force exerted by range spring 48, abutment 50A carried by thrust pin 18 moves off of switch arm 38A. However, due to the internal construction of switch 38, contacts 38C remain in closed contact position until thrust pin 18 moves sufficiently upward to cause its lower abutment 50B to engage switch arm 38A and move it upwardly, snapping switch contacts 38C to open position. This terminates operation of the compressor motor (not shown) until the pressure on the bottom side of the diaphragm 16 reduces sufficiently to allow thrust pin 18 to be moved downward by the force of range spring 48 on lever 26, again closing switch contacts 38C.

It is, thus, seen that range spring 48 establishes the pressures required to act on diaphragm 16 in order to cause switch contacts 38C to be opened and closed. A predetermined differential of operation between the opening and closing of contacts 38C is determined by the spacing of abutments 50A and 50B carried by thrust pin 18. Thus, the amount of pressure at which the switch will operate in the increasing pressure direction is determined by the force exerted by spring 48 and that point is variable by adjusting the compression of spring 48. This may be accomplished by turning range adjusting nut 46 downward on stud 42.

Assuming that the pressure differential between the opening and closing of contacts 38C is 30 pounds per square inch, range spring 48 may be adjusted in compression for causing opening of switch contacts 38C at, say, sixty pounds per square inch, acting on diaphragm 16 to stop operation of the compressor (not shown). Reclosing of contacts 38C then occurs, when the pressure at diaphragm 16 decreases to thirty pounds.

The present improvement provides the switching mechanism with a visual gauge for quickly indicating to the operator the present pressure acting on the switching mechanism and where the switching mechanism is in relation to its operating "cut-in" and "cut-out" points, as will now be described.

The visual gauge comprises an indicator member, generally designated 52, and a scale member, generally designated 54. Indicator member 52 is of hollow cylindrical configuration, open at the lower end 52A (FIG. 4) and nested over range spring 48 with threaded portion 42B of stud 42 extending loosely through an aperture 56 defined in its upper end wall 52B.

In assembly, indicator member 52 is placed over range spring 48 and range adjusting nut 46 is then threaded onto threaded end 42B of stud 42. Indicator member 52, thus, moves up and down along the longitudinal axis of range spring 48 as range adjusting nut 46 is threaded up and down on stud 42 for adjusting the force exerted by range spring 48 on switch lever 26.

Scale member 54 is also of hollow cylindrical shape, is open at both ends and dimensioned to fit loosely over cylindrical indicating member 52. Scale member 54 is provided near its lower end with two internally extending dimples 54A and 54B for coaction with dimple receiving apertures 58A and 58B defined in upwardly extending side flanges 26B and 26C formed in main operating switch lever 26. Scale member 54 is, thus, mounted on main lever 26 for movement therewith. Scale member 54 is provided with a graduated scale, as is indicated in FIGURE 1, positioned along an axial slot 64, extending along the longitudinal axis of member 54 from its top end towards its lower end. A portion of the exterior of indicating member 52 is visible through slot 64.

With such an arrangement, after assembly, scale member 54 is movable upward with main lever 26 in response to pressure exerted upon the lever by thrust pin 18, lever 26 compressing the opposing range spring 48. Assuming a certain predetermined amount of force acting to move lever 26 upward against the restraining force of range spring 48, the position of range adjusting nut 46 on stud 42 is adjusted to provide a predetermined amount of force resisting sufficient movement of lever 26 to actuate switch contacts 38C open.

For example, assume that range spring 48 is adjusted to cause actuation of switch arm 38A to open switch contacts 38C when the pressure acting on diaphragm reaches, say sixty pounds per square inch, which may be termed a "cut-out" pressure of the mechanism. With such pressure applied to diaphragm 16 indicating member 52 is moved up and down relative to scale member 54 with nut 46 until the predetermined "cut-out" point of contacts 38C is attained. At such setting, a mark, indicated at 68 (FIG. 1), is placed, in any convenient manner, on indicator member 52 in alignment through slot 64 with the 60 pound mark of the scale of scale member 54. As pressure exerted thereafter on lever 26 decreases, causing it to move downward due to the force of range spring 48 opposing such pressure, the compression of range spring 48 decreases. Scale member 54 also carried by lever 26, thus, moves longitudinally relative to indicator mark 68 continuously indicating on the scale the decreasing pressure acting on lever 26 until, what may be termed, the "cut-in" point of the switching mechanism is reached. At such point switch contacts 38C are actuated to closed condition by the downward movement of thrust pin 18.

The opposite relative motion occurs between indicator member 52 and scale member 54 upon increases in pressure acting upon lever 26. In this manner the scale member 54 cooperates with indicator member 52 to provide a continuously visual gauge.

Next assume that for a different application adjustment of the range spring setting is required and is effected by rotating adjusting nut 46, as has been previously described. Indicating member 52 moves up and down with nut 46 as the compression of spring 48 is changed. Such movement relative to scale member 54 changes the alignment of its mark 68 with the scale markings to maintain the gauge automatically in calibration to indicate continuously the pressure acting on lever 26.

It should be noted that, if it is desired, the mounted positions of indicator member 52 and scale member 54 may be interchanged without affecting the operation of the subject mechanism. That is, scale member 54 may be mounted for movement with adjusting nut 46, while indicator member 52 is mounted on operating lever 26.

As changes can be made on the above described construction and many apparently different embodiments of this invention can be made without departing from the scope thereof, it is intended that all matter contained in the above description or shown on the accompanying drawing being interpreted as illustrative only and not in a limiting sense.

What is claimed is:
1. In a mechanically actuated transducer a main operating lever,
force sensing means acting on said lever for urging said lever in one direction in response to variations of force sensed,
spring means acting on said lever in opposition to said force sensing means,
control means operatively connected to said lever for actuation by movement of said lever,
means for adjusting the force of said spring means acting on said lever,
characterized in that there is provided:
an indicator member mounted on a selected one of said spring adjusting means and said operating lever for movement therewith for indicating the acting force of said spring means, and
a scale member mounted on the other one of said adjusting means and said operating lever,
said scale member having a graduated scale indicated thereon positioned to coact with said indicator member for providing by relative movement therewith a visual gauge continuously indicating said force urging said operating lever in said one direction, and for automatically recalibrating said gauge for various adjustments of said acting spring force.

2. In the mechanically actuated transducer as set forth in claim 1 wherein said control means comprises switching means.

3. In a mechanical to electrical transducer,
a main operating lever,
force sensing means acting on said lever for urging said lever in one direction in response to variations of force sensed,
spring means acting on said lever in opposition to said force sensing means,
electrical circuit controlling means operatively connected to said lever for actuation by movement of said lever,
means for adjusting the force of said spring means acting on said lever,
characterized in that there is provided:
an indicator member mounted for movement with said spring adjusting means for indicating the acting force of said spring means, and
a scale member mounted on said operating lever and having a graduated scale indicated thereon positioned to coact with said indicator member for providing by relative movement therewith a visual gauge continuously indicating said force urging said operating lever in said one direction, and for automatically recalibrating said gauge for various adjustments of said acting spring force.

4. In the mechanical to electrical transducer as set forth in claim 3 wherein said spring means comprises a coil spring,
wherein said means for adjusting the force of said spring means comprises a threaded stud extending along the longitudinal axis of said spring and an adjusting nut threaded on said stud for adjusting the compression of said spring acting on said operating lever, and
wherein said indicator member is mounted for movement with said adjusting nut along the longitudinal axis of said coil spring.

5. In the mechanical to electrical transducer as set forth in claim 4 wherein said scale member is mounted on said operating lever with its said graduated scale extending along the longitudinal axis of said coil spring for coaction with said indicator member as said coil spring is compressed by both adjustment of said adjusting nut on said stud and actuation of said lever by said force sensing means.

References Cited

UNITED STATES PATENTS 2,953,929   9/1960   Kautz _____ 73—4 XR

DONALD O. WOODIEL, Primary Examiner

U.S. Cl. X.R.

73—406; 116—70; 200—83, 167